United States Patent
Levsen (10) Patent No.: US 8,250,766 B2
(45) Date of Patent: Aug. 28, 2012

(54) SAFETY RELEASE FOR DIRECT DRIVE OF ROTARY KNIFE

(75) Inventor: Clark A. Levsen, Shawnee, KS (US)

(73) Assignee: Hantover, Inc., Kansas City, MO (US)

( * ) Notice: Subject to any disclaimer, the term of this patent is extended or adjusted under 35 U.S.C. 154(b) by 773 days.

(21) Appl. No.: 12/350,057

(22) Filed: Jan. 7, 2009

(65) Prior Publication Data

US 2010/0170097 A1    Jul. 8, 2010

(51) Int. Cl.
*B26B 13/00* (2006.01)
(52) U.S. Cl. ............................ 30/276; 30/206; 30/233
(58) Field of Classification Search .................. 30/276, 30/206, 233, 205; 464/51–53
See application file for complete search history.

(56) References Cited

U.S. PATENT DOCUMENTS

| | | | |
|---|---|---|---|
| 2,596,335 A | 5/1952 | Kessler | |
| 4,555,238 A | 11/1985 | Miller et al. | |
| 4,794,273 A * | 12/1988 | McCullough et al. | 307/139 |
| 4,813,140 A * | 3/1989 | Calcinai | 30/276 |
| 4,894,915 A * | 1/1990 | Decker et al. | 30/276 |
| 4,989,323 A * | 2/1991 | Casper et al. | 30/296.1 |
| 5,025,559 A * | 6/1991 | McCullough | 30/276 |
| 6,134,789 A * | 10/2000 | Strickland | 30/276 |
| 6,354,949 B1 | 3/2002 | Baris et al. | |
| 6,665,943 B1 * | 12/2003 | Sloane et al. | 30/276 |
| 7,153,202 B2 | 12/2006 | Rosu et al. | |
| 2007/0283574 A1 * | 12/2007 | Levsen | 30/276 |

* cited by examiner

*Primary Examiner* — Boyer D Ashley
*Assistant Examiner* — Omar Flores Sanchez
(74) *Attorney, Agent, or Firm* — Hovey Williams LLP (57) ABSTRACT

A rotary knife assembly includes a rotary knife with a spinning blade, a motor operable to power the rotary knife, a flexible drive cable with a proximal end drivingly connected to the knife to transmit rotational power to the blade while being flexed along the length of the cable, and a safety release drivingly connected to a distal end of the cable. The safety release is drivingly coupled to the motor and is operable to transmit rotational power from the motor to the drive cable and thereby the rotary knife. The safety release includes input and output members releasably drivingly engaged with one another. The safety release is operable to drivingly disengage the members.

27 Claims, 6 Drawing Sheets

SAFETY RELEASE FOR DIRECT DRIVE OF ROTARY KNIFE

BACKGROUND

1. Field

The present invention relates generally to a safety release for a shaft drive. More specifically, embodiments of the present invention concern a safety release for use with a powered rotary knife.

2. Discussion of Prior Art

Figure 1:
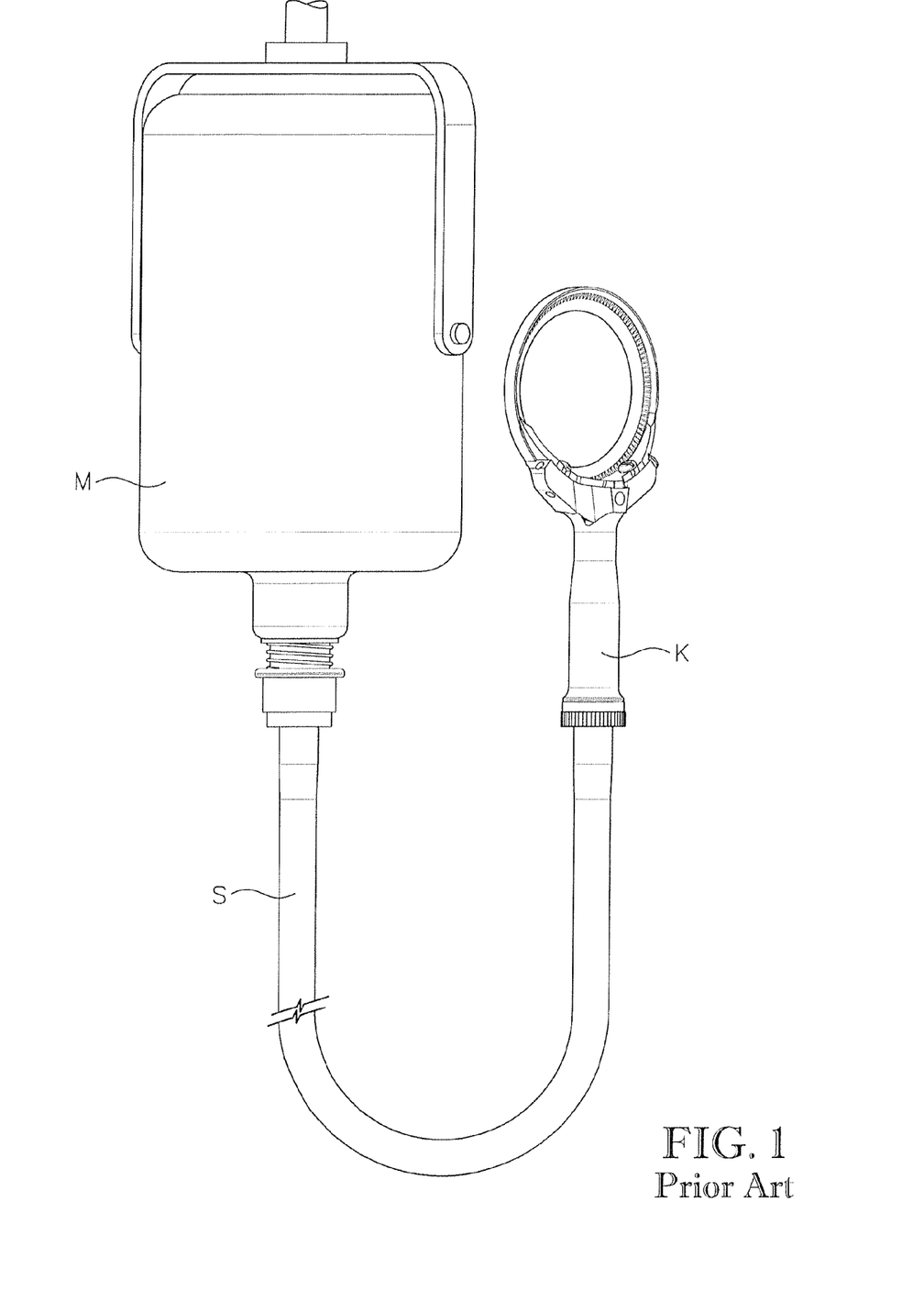
FIG. 1 is an elevation of a prior art powered knife including a motor, rotary knife, and a flexible drive shaft.
Figure 2:
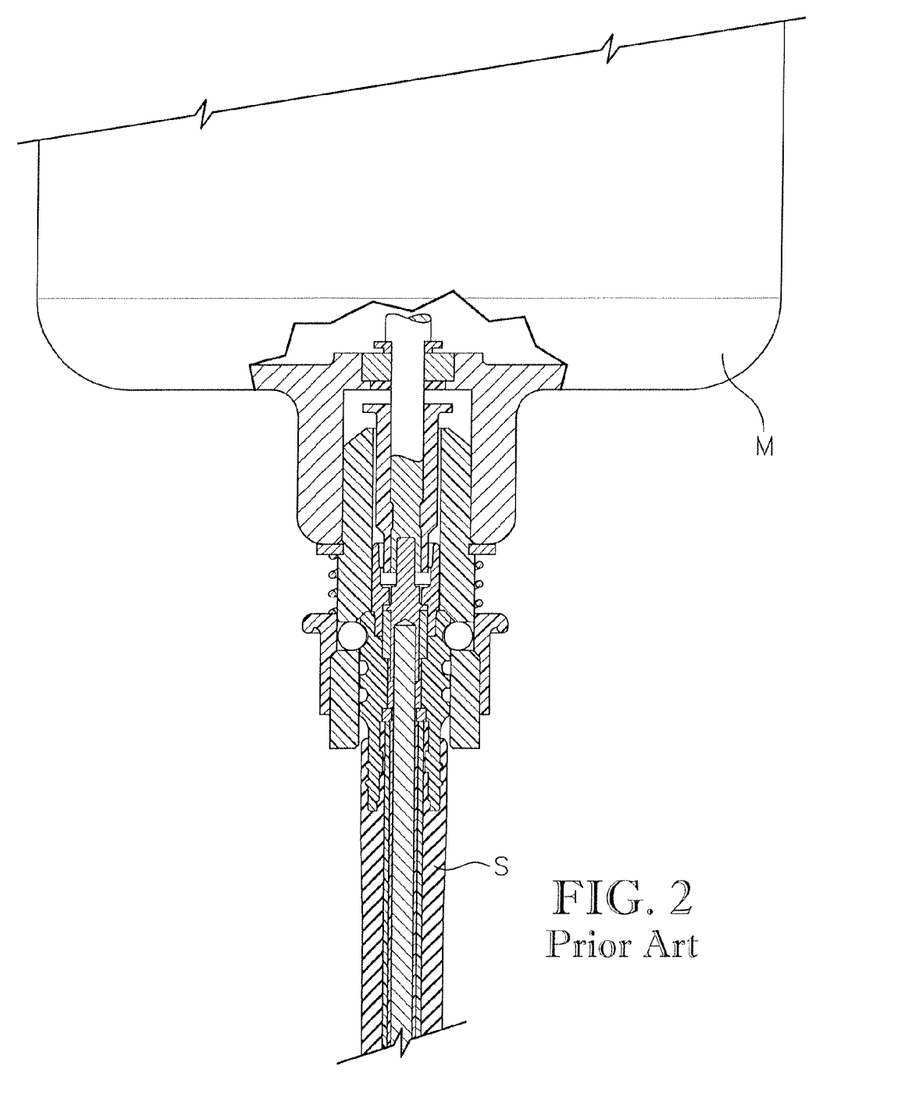
FIG. 2 is an enlarged fragmentary elevation of the prior art powered knife shown in FIG. 1, with part of the motor broken away and the drive shaft cross-sectioned to show a removable quick-coupled connection between the motor and drive shaft.

Powered knifes have long been used in the meat processing industry for dressing an animal carcass. The process of dressing the carcass normally involves removing meat and fat from various bones (i.e., boning), cutting various bones, and trimming the meat. Powered rotary knives enable workers to perform this process with much greater efficiency than traditional, unpowered knives. Among these prior art powered knives are rotary knives that include a rotating annular blade rotatably driven within a knife housing. Rotary knives can be either electrically or pneumatically powered and are able to spin the annular blade at very high rotational speeds. Electrically powered rotary knives include an electric motor and a flexible drive shaft that directly connects the motor and the rotary knife (see FIGS. 1 and 2). The prior art flexible drive shaft S depicted in FIGS. 1 and 2 is drivingly connected to the motor M with a quick-coupled connection so that drive shaft S powers rotary knife K.

Conventional rotary knives are problematic and suffer from certain limitations. One problem encountered by prior art knives is that the annular blade within the knife housing can be restricted from rotating during operation. For instance, a bone or other obstruction encountered while dressing a carcass can become lodged between the blade and housing and either slow blade rotation or entirely stop the blade. Also, the annular blade and other components of the rotary knife can become worn from extensive use and cause the blade to bind within the housing. During installation, the annular blade can become misaligned within the housing and blade misalignment can also cause excessive wear of knife components and binding of the blade. Furthermore, the high-speed rotational movement of the annular blade, which is ideal for quickly and efficiently processing meat, often serves to accelerate wear of the annular blade and other knife components and can promote blade binding. The flexible drive shaft of a conventional electrically powered rotary knife can also experience binding (e.g., by becoming kinked or bent) that also restricts rotation of the drive shaft or of the annular blade. For shaft-driven rotary knives, binding of the blade or shaft is known to expose the elongated flexible shaft to a significant amount of torque and cause the flexible shaft to twist or move unexpectedly. Some prior art shaft-driven rotary knives include a lever mounted on the knife handle that can be depressed by the operator to selectively power the knife (e.g., the lever can be released by the operator when an obstruction binds the blade to remove at least some torque on the shaft drive). However, these conventional rotary knives are not ergonomically designed and are known to cause the operator to experience fatigue in the hand and arm from holding the knife and depressing the lever over a long period of time (e.g., a user will operate the same knife for an eight hour work day, five days per week). Accordingly, there is a need for an improved powered rotary knife that does not suffer from these problems and limitations.

SUMMARY

Embodiments of the present invention provide a safety release for a shaft drive that does not suffer from the problems and limitations of the prior art shaft drives set forth above.

A first aspect of the present invention concerns a rotary knife assembly broadly including a motor, a rotary knife, an elongated flexible drive cable, and a safety release. The motor includes a rotating drive shaft. The rotary knife includes a spinning blade operable to be powered by the motor. The elongated flexible drive cable has proximal and distal ends, with the proximal end being drivingly connected to the knife so that the drive cable is operable to transmit rotational power to the blade while being flexed along the length of the cable. The safety release is drivingly connected to the distal end of the drive cable. The safety release is drivingly coupled to the motor and is operable to transmit rotational power from the motor to the drive cable and thereby the rotary knife. The safety release includes input and output members releasably drivingly engaged with one another, with the input member drivingly coupled to and powered by the drive shaft and the output member drivingly connected to the distal end of the drive cable. The safety release is operable to drivingly disengage the input and output members when torque applied to the members by the motor exceeds a predetermined amount corresponding with binding of the rotary knife or the drive cable.

A second aspect of the present invention concerns a safety coupling configured to be used with a rotary knife assembly that includes a motor with a motor drive shaft, a rotary knife, and an elongated flexible drive cable. The flexible drive cable is configured to transmit rotational power to the rotary knife while being flexed along the length of the cable. The motor and the drive cable each include a connector, with the safety coupling operable to be drivingly connected to the connector of the drive cable and drivingly connected to the connector of the motor. Each of the connectors presents a connector mating surface. The safety coupling is configured to transmit rotational power from the motor to the drive cable and thereby to the rotary knife. The safety coupling broadly includes a coupling body, input and output members, and a release mechanism. The coupling body presents opposite coupler ends and a chamber extending between the ends. The coupler ends each define a connection axis and present a coupler mating surface spaced radially from and extending about the respective connection axis. The coupler ends are operable to be releasably mated with a corresponding one of the connectors, with the coupler ends configured so that the connector mating surface is spaced radially from and extends about the respective connection axis. The coupler ends are configured to cooperate with a corresponding one of the connectors to present an associated pair of connector and coupler mating surfaces arranged so that one is slidably received within the other. The input and output members present respective faces releasably drivingly engaged with one another, with the input member operable to be drivingly coupled to and powered by the motor drive shaft and the output member operable to be drivingly connected to the distal end of the drive cable. The release mechanism interconnects the members and is operable to drivingly disengage the input and output members when torque applied to the members by the motor exceeds a predetermined amount corresponding with binding of the blade or drive cable. The input and output members and the release mechanism are rotatably supported by the coupling body and positioned within the chamber. The coupler mating surfaces each define a common surface diameter of the associated pair of connector and coupler mating surfaces. The input and output members each have a maximum diametrical dimension that is less than the common surface diameter, with the members being at least partly positioned within the coupler mating surface of the at least one of the pairs.

A third aspect of the present invention concerns a method of retrofitting the drive train of a rotary knife assembly with a safety coupling. The rotary knife assembly includes a motor, a rotary knife, and an elongated flexible drive cable. The flexible drive cable is configured to transmit rotational power from the motor to the rotary knife while being flexed along the length of the drive cable. The safety coupling includes input and output members releasably drivingly engaged with one another. The method broadly includes the step of installing the safety coupling by drivingly coupling the input member to a motor drive shaft and drivingly connecting output member to the drive cable, with the safety coupling configured to transmit rotational power from the motor to the drive cable and thereby to the rotary knife. The safety coupling is configured to drivingly disengage the motor and the drive cable when torque applied to the members by the motor exceeds a predetermined amount corresponding with binding of the rotary knife or the drive cable.

Other aspects and advantages of the present invention will be apparent from the following detailed description of the preferred embodiments and the accompanying drawing figures.

BRIEF DESCRIPTION OF THE DRAWING FIGURES

Preferred embodiments of the invention are described in detail below with reference to the attached drawing figures, wherein.

The drawing figures do not limit the present invention to the specific embodiments disclosed and described herein. The drawings are not necessarily to scale, emphasis instead being placed upon clearly illustrating the principles of the preferred embodiment.

DETAILED DESCRIPTION OF THE PREFERRED EMBODIMENTS

Figure 3:
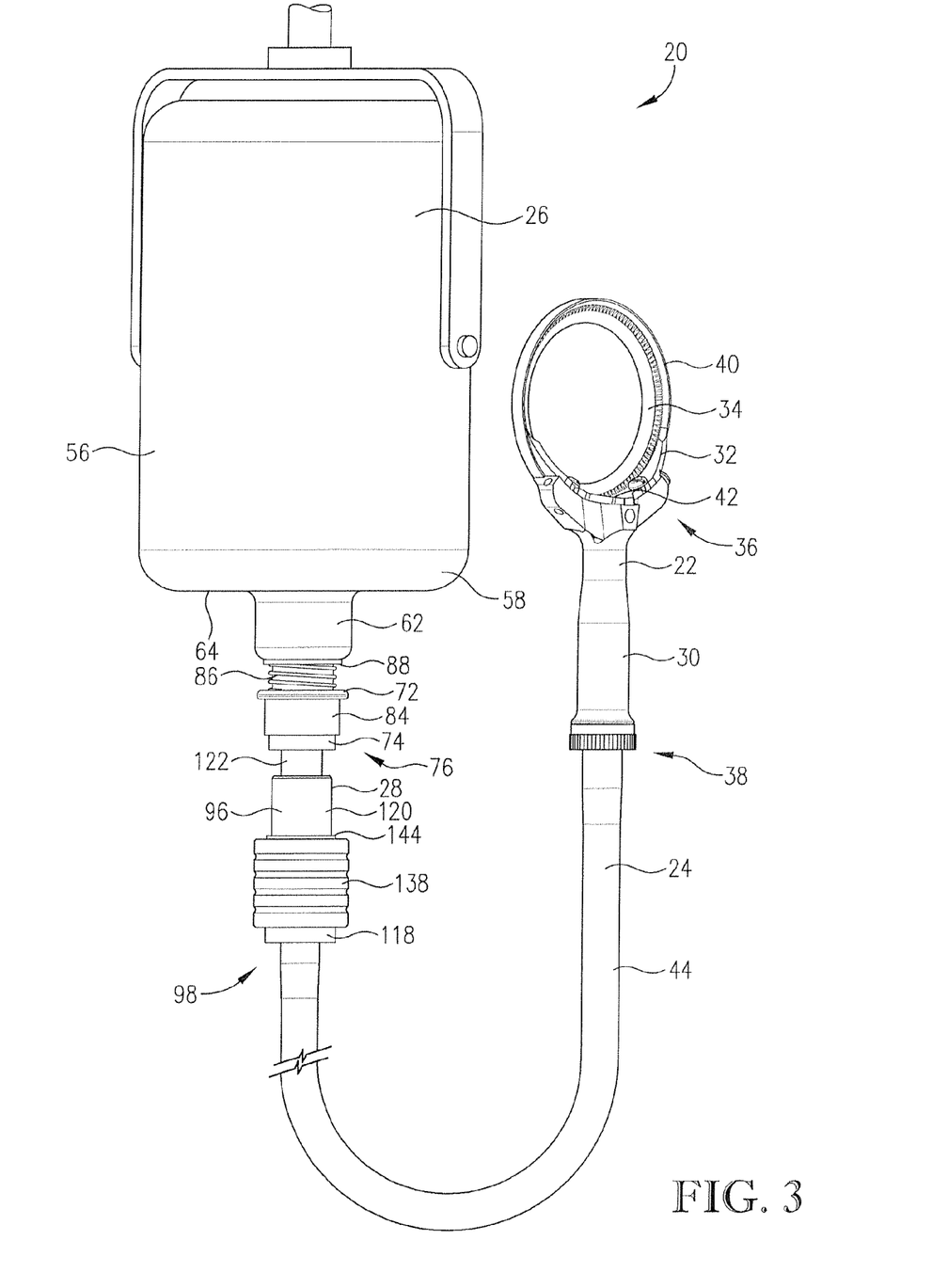
FIG. 3 is an elevation of a powered knife assembly constructed in accordance with a preferred embodiment of the present invention, with the powered knife assembly including a rotary knife, drive cable, coupling, and motor drivingly interconnected.

Turning initially to FIG. 3, a powered rotary knife assembly 20 is configured to be used in an animal slaughterhouse for dressing an animal carcass, although other knife applications are entirely within the ambit of the present invention.

The rotary knife assembly 20 broadly includes a rotary knife 22, a flexible drive cable 24, a motor 26, and a safety coupling 28 that are drivingly connected to one another, with power being transmitted from the motor 26 to the rotary knife 22 by the drive cable 24 and safety coupling 28.

The rotary knife 22, depicted in FIG. 3, is a conventional rotary knife operable for trimming, boning, and cutting the animal carcass. The rotary knife 22 includes a handle 30, a blade housing 32, and a rotating annular blade 34. The handle 30 presents a front blade support end 36 and a rear connector end 38 that connects to the drive cable 24. The handle 30 further includes a transmission (not shown) with a transmission input end positioned adjacent the connector end 38 and a transmission output end positioned adjacent the blade support end 36. The blade housing 32 is annular and includes an annular ring 40 and a flange 42. The flange 42 is attached to the blade support end 36 of the handle 30. The annular blade 34 comprises an endless circular blade and is rotatably supported by the blade housing 32. The annular blade 34 is drivingly attached to the transmission output end, with the transmission being operable to spin the annular blade 34. Additional features of the preferred rotary knife 22 are disclosed in pending U.S. application Ser. No. 11/839,382, entitled ROTARY KNIFE WITH BLADE BUSHING, which is a continuation-in-part of U.S. application Ser. No. 11/423,266 entitled ROTARY KNIFE WITH BLADE BUSHING, both of which are hereby incorporated in their entirety by reference herein. The terms "proximal" and "distal" will be used herein to describe features of the rotary knife assembly 20 located along the drive train of the rotary knife assembly 20 and positioned relative to the handle 30 of the rotary knife 22.

Turning to FIGS. 3-6, the flexible drive cable 24 is configured to transmit rotational power from the motor 26 to the rotary knife 22 while being flexible along its length to permit movement of the rotary knife 22 relative to the motor 26 during knife operation. The drive cable 24 includes an outer sheath 44, a drive shaft 46 extending through the outer sheath 44 and rotatably received therein, a distal end defined by a male coupler 48 of the drive cable 24, and a proximal end. The illustrated drive cable 24 is elongated and is preferably at least about 3 feet in length from end to end. More preferably, the length of the drive cable 24 is between about 3 feet and about 10 feet.

A proximal end of the drive cable 24 is connected to the connector end 38 of the rotary knife 22. Furthermore, the drive shaft 46 is drivingly connected to the transmission input end of the transmission mounted in the handle 30, with the drive cable 24 being operable to transmit rotational power to the rotary knife 22 and thereby spin the annular blade 34. The male coupler 48 presents proximal and distal cylindrical coupler surfaces 50,52 and an endless coupler groove 54. The male coupler 48 is operable to be secured to a complemental coupler end, with the mated couplers configured to transmit rotational power. As will be discussed, the rotary knife 22 and drive cable 24 can experience binding when powered by the motor 26 such that the binding either slows or stops rotation of the rotary knife 22 or drive cable 24.

Figure 4:
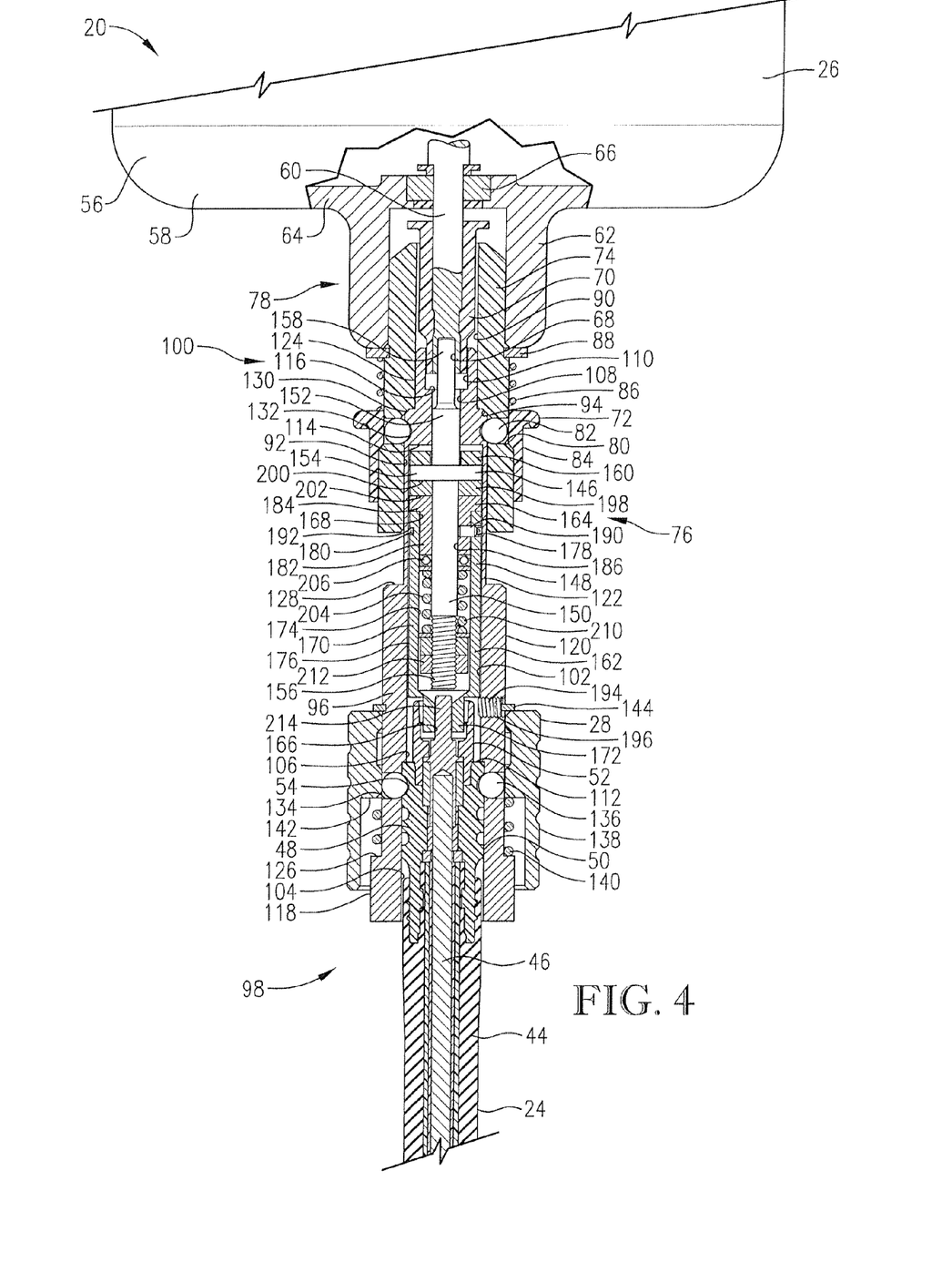
FIG. 4 is an enlarged fragmentary elevation of the powered knife shown in FIG. 3, showing part of the motor broken away and the coupling and drive cable cross-sectioned, with the coupling including a coupling body, movable coupling sleeve, input and output drive members, friction disc, spring, thrust bearings, and spring adjustment nuts.

Turning to FIGS. 3 and 4, the motor 26 is operable to supply rotational power to the rotary knife 22. The illustrated motor 26 includes a conventional electric motor 56 with a motor housing 58 and a rotatable motor drive shaft 60. The motor housing 54 includes a fitting 62 that projects from a proximal end wall 64 of the housing 54. The fitting 58 presents a bore that receives the drive shaft 56. The housing 54 also includes a bushing 66 mounted in the end wall 64 and rotatably receiving the drive shaft 60. The drive shaft 60 presents a square hole 68 that projects from a proximal end of the drive shaft 60. A shaft sleeve 70 is mounted on the drive shaft 60 adjacent the proximal end of the drive shaft 60. The shaft sleeve 70 includes a flange positioned adjacent the bushing 66.

The motor 26 further includes a motor connector 72 with a cylindrical connector body 74 presenting proximal and distal ends 76,78. The connector body 74 presents holes 80 adjacent the proximal end 76, and the holes 80 each receive a coupler ball 82. The motor connector 72 further includes a movable connector sleeve 84 slidably mounted on the connector body 74. In the usual manner, the sleeve 84 is positioned to surround the balls 82 and is shiftable into and out of a locked position where the sleeve 84 holds the balls 82 in a radially innermost position. The sleeve 84 is urged into the locked position by a spring 86. A snap ring 88 is mounted on the connector body 74 in an annular groove positioned between the ends 76,78. The connector body 74 presents distal bore 90 that receives the drive shaft 60 and a proximal bore 92 that serves as an inwardly facing connector mating surface, with a shoulder 94 that extends between the bores 90,92. The connector 72 serves as a female connector operable to receive a complementally-shaped male coupler, as will be discussed further. The motor connector 72 is attached to the housing 58 by securing the distal end 78 of the connector body 74 within the bore of the fitting 62.

Turning to FIGS. 4-7, safety coupling 28 is preferably operable to be directly drivingly connected to the motor 26 and to drivingly connect the motor 26 and drive cable 24. The safety coupling 28 includes a coupling body 96 that is generally tubular and presents opposite proximal and distal coupling ends 98,100. The coupling body 96 presents a bore 102 extending between the ends 98,100 along a bore axis, with the bore 102 including a cable shaft bore section 104, a proximal shaft support bore section 106, a distal shaft support bore section 108, and a motor shaft bore section 110 (see FIGS. 4 and 6). The bore 102 also includes proximal, intermediate, and distal bore shoulders 112,114,116 that extend between corresponding adjacent pairs of bore sections 104,106,108, 110. The coupling body 96 further presents outwardly facing cylindrical outer surfaces 118,120,122,124 that are generally spaced end-to-end from the proximal end 98 to the distal end 100 of the coupling body 96. The coupling body 96 also presents proximal, intermediate, and distal outer shoulders 126,128,130 that extend between corresponding adjacent pairs of outer surfaces 118,120,122,124. The coupling body 96 further presents a pair of annular groove segments 132 positioned end-to-end and extending circumferentially along the cylindrical surface 122 adjacent distal coupling end 100 and radial holes 134 positioned adjacent proximal end 98 and spaced about the bore section 104. The radial holes 134 each receive a coupler ball 136.

Turning again to FIGS. 4-7, the safety coupling 28 also includes a coupler sleeve 138 slidably mounted on the cylindrical surface 120 of the coupling body 96 adjacent the proximal end 98. The coupler sleeve 138 is positioned to surround the coupler balls 136 and is slidable into and out of a locked position where the sleeve 138 holds the balls 136 in a radially innermost position. The sleeve 138 is urged into the locked position by a spring 140 mounted on the cylindrical surface 120 of the coupling body 96. The spring 140 is positioned between an internal shoulder 142 presented by the sleeve 138 and the outer shoulder 126 presented by the coupling body 96 adjacent the proximal end 98 thereof. A snap ring 144 is mounted on the coupling body 96 in an annular groove that extends circumferentially along the cylindrical surface 120 and is positioned to restrict sliding movement of the coupler sleeve 138 in a distal direction beyond the locked position.

Figure 6:
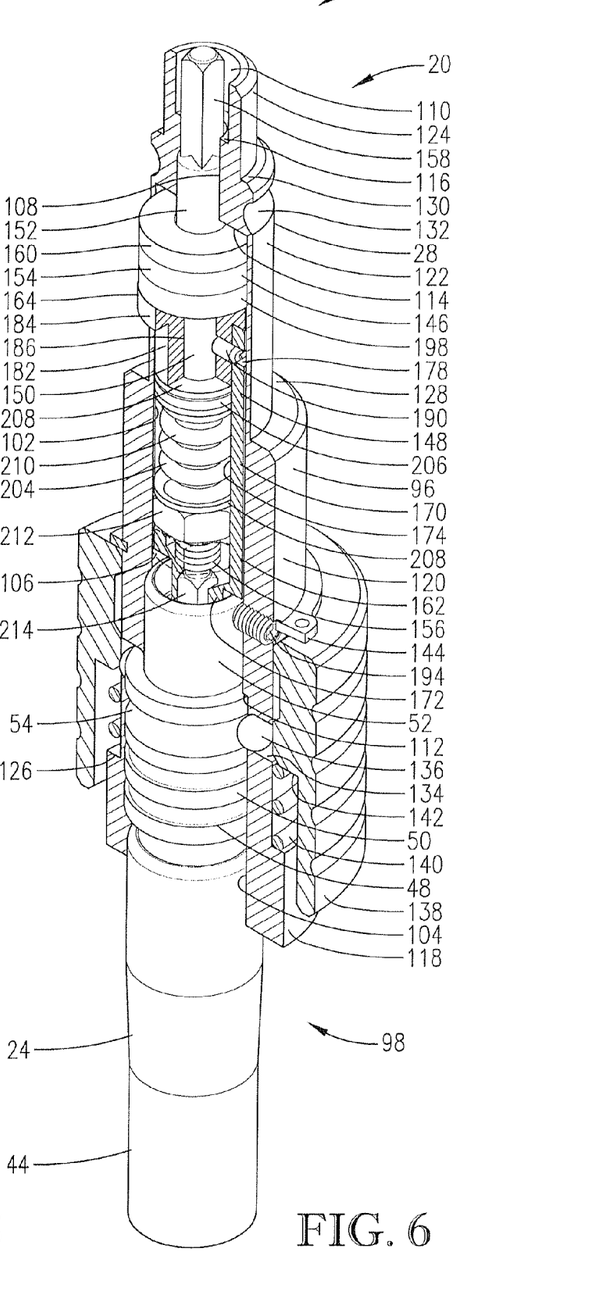
FIG. 6 is a fragmentary perspective of the powered knife shown in FIGS. 3-5, showing the distal end of the drive cable received by a proximal end of the coupling, with the drive cable and coupling drivingly interconnected.
Figure 7:
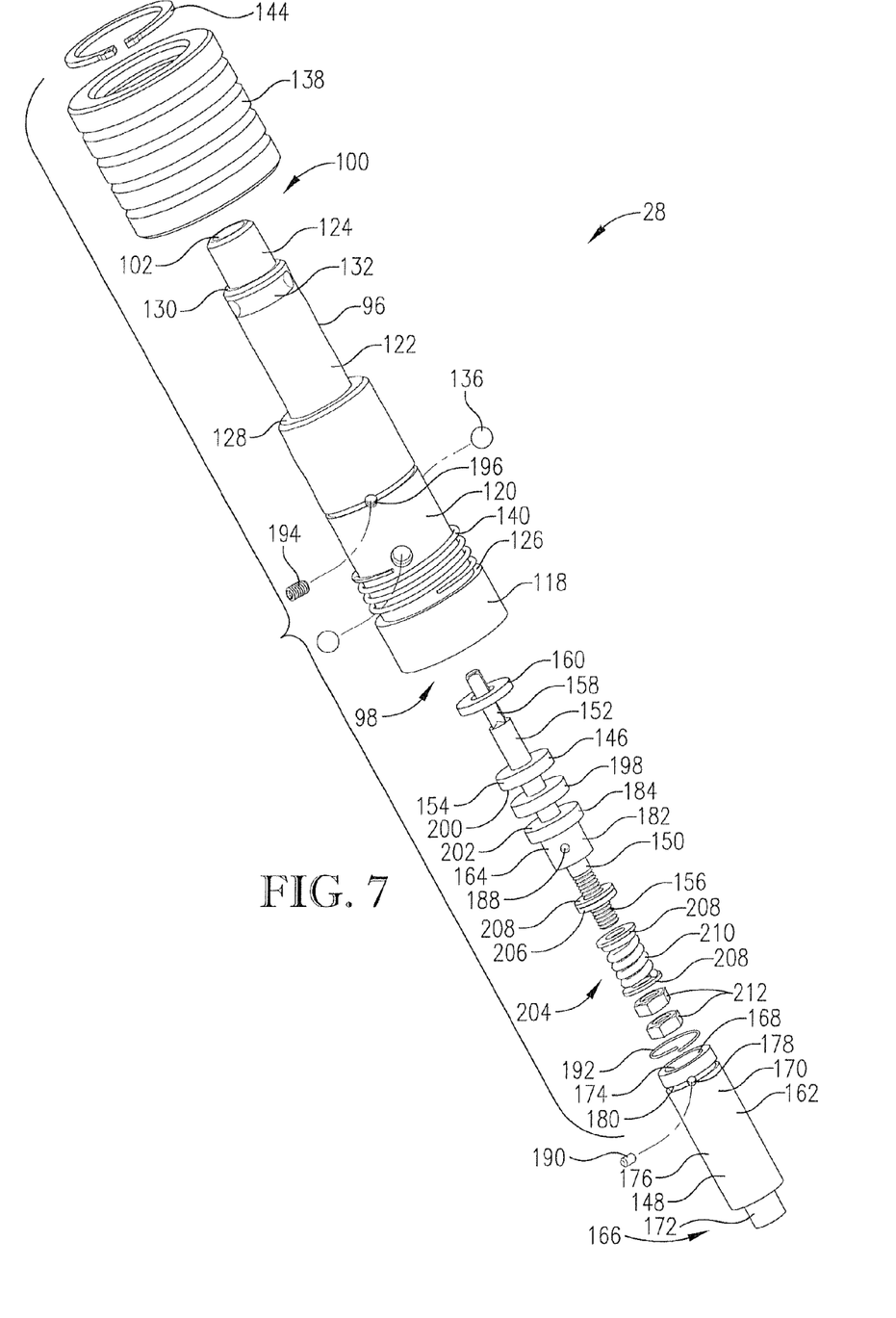
FIG. 7 is an exploded view of the coupling shown in FIGS. 3-6.

Turning now to FIGS. 4, 6, and 7, the safety coupling 28 further includes a coupling drive with input and output drive members 146,148 that serve to selectively transmit power through the safety coupling 28. The input drive member 146 is unitary and includes proximal and distal shaft sections 150,152 and a circular plate 154 that connects the shaft sections 150,152. Proximal shaft section 150 presents a threaded proximal end 156 and distal shaft section 152 presents a square distal end 158 with a square cross section. The input drive member 146 is rotatably mounted within the coupling body 96, with the plate 154 being positioned adjacent the shoulder 114 of the coupling body 96, and with the distal shaft section 152 extending through the distal coupler end 100. The safety coupling 28 also includes a washer 160 rotatably received by the coupling body 96 and positioned between the plate 154 and the shoulder 114. The washer 160 serves as a thrust bearing to permit rotation of the input drive member 146 while the input drive member 146 is urged toward the shoulder 114. The illustrated washer 160 is preferably a unitary piece of nylon, but it is within the ambit of the present invention where another low-friction material is used. Furthermore, another type of bearing, such as a ball bearing, could be used to support the input drive member 146.

The output drive member 148 includes an outer shaft section 162 and a shaft bushing 164. The outer shaft section 162 is tubular and presents proximal and distal shaft openings 166,168. The outer shaft section 162 includes a tube 170 and a shaft fitting 172 integrally formed with one another. The tube 170 presents a bore 174 with a substantially continuous inner diameter and an outer cylindrical surface 176 with a substantially continuous outermost shaft diameter. The outer shaft section 162 also presents a transverse hole 178 and an outer groove 180 (see FIG. 7) formed in the tube 170 adjacent the distal shaft opening 168.

The shaft bushing 164 includes a cylindrical neck 182 and a plate 184 integrally formed with each other, with the neck 182 having a smaller outer diameter than the plate 184. The shaft bushing 164 also presents a through-hole 186 (see FIGS. 4 and 6) extending axially through the neck 182 and plate 184 and a transverse hole 188 (see FIG. 7) extending through the neck 182. The bushing 164 is attached to the outer shaft section 162 by inserting the neck 182 within the distal shaft opening 168. A shear pin 190 is inserted into aligned holes 178,188 to secure the bushing 164 within the outer shaft section 162 and restrict relative movement therebetween. The shear pin 190 is held in the holes 178,188 by wire coil 192 received in the groove 180 (see FIGS. 4 and 7). In the usual manner, the shear pin 190 is operable to fail if the torque applied to the output drive member 148 exceeds a predetermined value. The output drive member 148 is rotatably mounted within the coupling body 96, with the plate 184 being positioned adjacent the shoulder 114 of the coupling body 96 and positioned proximal to the plate 154. The output drive member 148 is restricted from sliding proximally out of the proximal end 98 of the coupling body 96 by a set screw 194 threaded into a threaded hole 196 in the coupling body 96 and positioned adjacent the proximal shaft opening 166, with the drive members 146,148 being held between the shoulder 114 and the set screw 194. The set screw 194 is removable to permit installation or removal of drive members 146,148.

Referring to FIGS. 4, 6, and 7, the safety coupling 28 also includes a friction disc 198 that permits releasable driving engagement between the drive members 146,148. The disc 198 is rotatably mounted in the coupling body 96 and positioned between the plates 154,184. In particular, the plates 154,184 present opposed annular faces 200,202 in engagement with corresponding faces of the disc 198 when the plates 154,184 are urged toward each other, i.e., the annular faces 200,202 of the plates 154,184 are in driving engagement. The term "driving engagement" is used herein to describe the condition when the input drive member 146 rotatably drives the output drive member 148. The illustrated faces 200,202, when urged into driving engagement, do not directly contact each other. However, the principles of the present invention are applicable where the safety coupling 28 does not include a friction disc 198 and the faces 200,202 directly contact each other when urged into driving engagement.

The friction disc 198 includes material that permits frictional engagement between the faces 200,202 and corresponding faces of the disc 198. In particular, the friction disc 198 is made of any material that suitably provides a high coefficient of friction while being wear resistant, e.g., cast iron, steel, graphite, or carbon. When the plates 154,184 are urged into driving engagement, rotation of the input drive member 146 causes rotation of the disc 198 and the output drive member 148. The disc 198 also permits a limited amount of relative axial movement between the drive members 146,148. For example, the drive members 146,148 may move away from each other when not in driving engagement. Also, where the disc 198 becomes worn on one or both of the disc faces, the drivingly engaged drive members 146,148 may move toward each other. The disc 198 and drive members 146,148 are positioned in the coupling body 96 in a substantially coaxial arrangement with one another and thereby rotate about a common shaft axis, with the shaft axis extending normal to the faces 200,202 and the corresponding faces of disc 198. Furthermore, the shaft axis is preferably substantially coaxial to the bore axis.

As shown in FIGS. 4, 6, and 7, the safety coupling 28 further includes a release assembly 204 operable to selectively permit relative rotation between the drive members 146,148. The release assembly 204 includes a thrust bearing 206, washers 208, a coil spring 210, and spring adjustment nuts 212. The thrust bearing 206 preferably comprises a ball bearing, but it is also within the scope of the present invention where another type of bearing is used, such as a journal bearing. The coil spring 210 comprises a compression spring mounted on the threaded end 156 of the proximal shaft section 150 and is held against the thrust bearing 206 by nuts 212. It is also within the scope of the present invention where another type of spring is used instead of the coil spring 210, e.g., one or more belleville washers.

The coil spring 210 is held in compression to produce a spring force that urges the plates 154,184 into engagement with the disc 198. The coefficient of friction between the plates 154,184 and disc 198, the spring force, and the area of frictional engagement between the plates 154,184 and disc 198 determine an amount of torque to be applied to the members 146,148 at which the plates 154,184 will rotate relative to each other. In addition, the nuts 212 are operable to be threaded along the threaded end 156 to selectively compress the coil spring 210. In this manner, the force applied by the spring 210 to the plate 184 can be adjusted by movement of nuts 212. Furthermore, the change in spring force produces a corresponding change in the amount of torque required to cause relative rotation between the plates 154,184. Thus, a predetermined minimum amount of torque to cause relative rotation between members 146,148 can be set by adjusting the nuts 212. The release assembly 204 is accessed for adjustment by removing the wire coil 192 and shear pin 190 from the shaft section 162 and shaft bushing 164, with the shaft section 162 being separable from the shaft bushing 164.

Prior to installation of the safety coupling 28, the drive cable 24 and motor 26 may be directly drivingly connected to each other (similar to the prior art assembly shown in FIGS. 1 and 2). Where the drive cable 24 and motor 26 are directly connected, the safety coupling 28 is installed by first detaching the drive cable 24 and motor 26. In particular, the connector sleeve 84 is shifted distally to release the coupler balls 82 and thereby permit removal of the male coupler 48 in a proximal direction out of the proximal bore 92.

Figure 5:
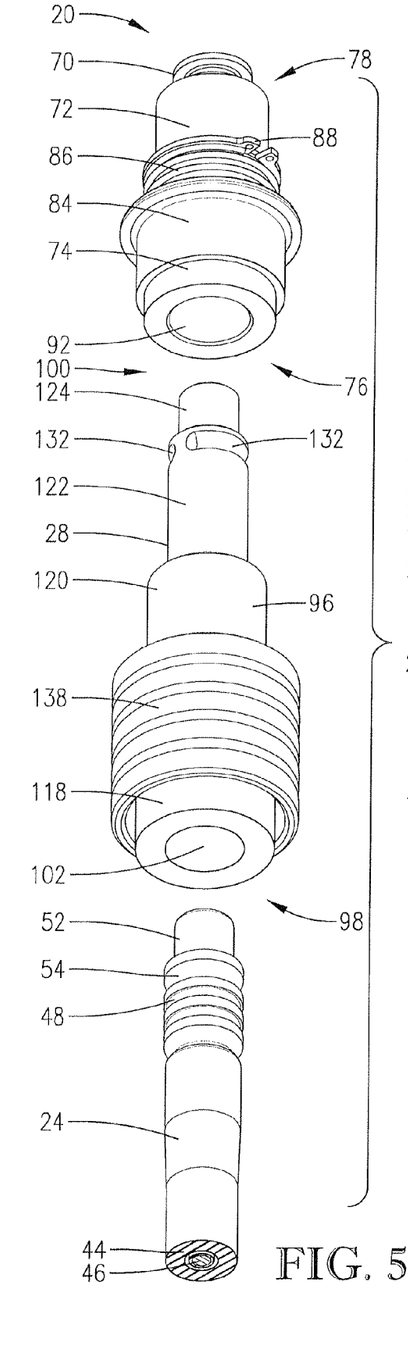
FIG. 5 is a fragmentary exploded view of the powered knife shown in FIGS. 3 and 4, showing a distal end of the drive cable, the coupling, and a coupler end of the motor, with the coupling being disconnected from the drive cable and motor.

Turning to FIGS. 4-6, the illustrated safety coupling 28 is installed by drivingly attaching the coupling 28 directly to the motor 26. In particular, the distal coupling end 100 is secured within the proximal end 76 of motor connector 72. Initially, the connector sleeve 84 is slid out of the locked position to permit the coupler balls 82 to retract. The distal coupling end 100 of safety coupling 28 is then inserted in a distal direction until the shoulder 130 of the coupling body 96 engages the shoulder 94 of the connector body 74. Also, the cylindrical surface 122 of coupling body 96 and proximal bore 92 of connector body 74 serve as complemental coupler and connector mating surfaces that engage each other and cooperatively support mating engagement of the coupler ends (i.e., proximal end 76 of body 74 and distal end 100 of coupling body 96). The complemental coupler and connector mating surfaces present substantially the same outermost diameter and thereby define a common surface diameter of the mated coupler ends 76,100.

With the distal coupling end 100 inserted, the groove segments 132 are positioned to receive the coupler balls 82 and the sleeve 84 can be returned to the locked position to secure the safety coupling 28 to the motor 26. Furthermore, the square end 158 of distal shaft section 152 is received in complemental square hole 68 presented at the end of motor drive shaft 60 and is thereby drivingly connected to the motor drive shaft 60. The illustrated groove segments 132 present groove ends that restrict rotation of the safety coupling 28 relative to the motor 26. Preferably, the safety coupling 28 can rotate through an angle less than about 180 degrees when secured to the motor 26. In this manner, the safety coupling 28 is restricted from being spun continuously by the motor drive shaft 60. While the illustrated safety coupling 28 is preferably directly attached to motor 26, for some aspects of the present invention a drive shaft, such as another flexible drive shaft, could drivingly interconnect the motor 26 and the safety coupling 28.

Preferably, the illustrated plates 154,184 of the drive members 146,148 and the friction disc 198 present a maximum diameter no greater than the nominal coupling diameter of the proximal and distal ends 98,100 of the coupling body 96. In the illustrated embodiment, this construction permits the members 146,148 to be positioned within the cylindrical surface 122 of coupling body 96 and proximal bore 92 of connector body 74. Thus, the plates 154,184 are received within the connector body 74 and this permits compact installation of the safety coupling 28 between the drive cable 24 and motor 26.

Still referring to FIGS. 4-6, the safety coupling 28 is further installed by drivingly attaching the coupling 28 to the drive cable 24. In particular, the distal male coupler 48 of the drive cable 24 is secured within the proximal end 98 of the safety coupling 28. The coupler sleeve 138 is slid out of the locked position to permit the coupler balls 136 to retract. The distal male coupler 48 is then inserted in a distal direction until the shoulder presented by the male coupler 48 engages the shoulder 112 presented by the bore 102. Also, the proximal surface 50 of male coupler 48 and bore section 104 of coupling body 96 serve as complemental coupler mating surfaces that engage each other and cooperatively support mating engagement of the coupler ends (i.e., the male coupler 48 and the proximal end 98 of coupling body 96). The complemental coupler mating surfaces present substantially the same outermost diameter and thereby define a nominal coupling diameter of the mated coupler ends 48,98. Preferably, the nominal coupling diameter of mated coupler ends 48,98 is substantially the same as the nominal coupling diameter of mated coupler ends 76,100. In this manner, the coupling 28 can be installed between the previously mated drive cable 24 and motor 26 as a retrofit for the drive train of the rotary knife assembly 20.

With the distal male coupler 48 inserted, the groove 54 is positioned to receive the coupler balls 136, and the sleeve 138 is operable to be returned to the locked position to secure the male coupler 48 within the safety coupling 28. Furthermore, a square distal end 214 of drive shaft 46 is received in complementally shaped proximal shaft opening 166 of the output drive member 148 and is thereby drivingly connected to the safety coupling 28.

The safety coupling 28 is configured to drivingly interconnect the motor 26 and drive cable 24. Preferably, the illustrated safety coupling 28 is removable from the drive cable 24 and motor 26. However, for some aspects of the present invention, the safety coupling 28 could alternatively be permanently connected between the motor 26 and drive cable 24. For example, the safety coupling 28 could be constructed as an integral part of the drive cable 24.

The safety coupling 28 is preferably constructed to interconnect drive cable 24 and motor 26 where the male coupler 48 and motor connector 72 can otherwise be directly drivingly coupled to each other. Thus, the safety coupling 28 can be installed with the remainder of the powered rotary knife assembly 20 as a retrofit. In particular, the proximal coupling end 98 is sized and shaped similar to motor connector 72 and the distal coupling end 100 is sized and shaped similar to male coupler 48 so that the couplers 48,72 can be detached from each other and the safety coupling 28 can be inserted in the drive train by coupling the distal coupling end 100 with the motor connector 72 and coupling the proximal coupling end 98 with the male coupler 48.

In operation, the rotary knife assembly 20 is configured for use in boning, trimming, and cutting of an animal carcass. The operator can grab and hold the rotary knife 22 along handle 30 and the flexible drive cable 24 permits the rotary knife 22 to be freely moved relative to the motor 26. The operator turns on the motor 26 using a switch (not shown), and the motor 26 rotates the motor drive shaft 60, which causes rotation of the drive members 146,148 in safety coupling 28, the flexible drive shaft 46, and the annular blade 34. In the event that the rotary knife 22 or drive cable 24 experiences binding that either slows or stops rotation of the rotary knife 22 and/or drive cable 24, the drive members 146,148 can be drivingly disengaged. In particular, when torque applied to the drive members 146,148 exceeds a predetermined amount that corresponds with binding of the rotary knife 22 or drive cable 24, the drive members 146,148 are operable to be drivingly disengaged. Once the applied torque returns below the predetermined torque amount, the drive members 146,148 become drivingly engaged again and transmit rotational power from the motor 26 to the drive cable 24 and to the rotary knife 22.

The preferred forms of the invention described above are to be used as illustration only, and should not be utilized in a limiting sense in interpreting the scope of the present invention. Obvious modifications to the exemplary embodiments, as hereinabove set forth, could be readily made by those skilled in the art without departing from the spirit of the present invention.

The inventor hereby states his intent to rely on the Doctrine of Equivalents to determine and assess the reasonably fair scope of the present invention as pertains to any apparatus not materially departing from but outside the literal scope of the invention as set forth in the following claims.

What is claimed is:

1. A method of retrofitting the drive train of a rotary knife assembly with a safety coupling, said rotary knife assembly including a motor, a rotary knife, and an elongated flexible drive cable, said flexible drive cable configured to transmit rotational power from the motor to the rotary knife while being flexed along the length of the drive cable, said safety coupling including input and output members releasably drivingly engaged with one another, said method comprising the step of:

(a) installing the safety coupling by drivingly coupling the input member to a motor drive shaft and drivingly connecting output member to the drive cable, with the safety coupling configured to transmit rotational power from the motor to the drive cable and thereby to the rotary knife, said safety coupling being configured to drivingly disengage the motor and the drive cable when torque applied to the members by the motor exceeds a predetermined amount corresponding with binding of the rotary knife or the drive cable.

2. The method as claimed in claim 1; and (b) disconnecting the motor and drive cable from driving engagement with one another, with step (b) occurring before step (a).

3. A rotary knife assembly comprising:

a motor including a rotating drive shaft;

a rotary knife including a spinning blade operable to be powered by the motor;

an elongated flexible drive cable having proximal and distal ends, with the proximal end being drivingly connected to the knife so that the drive cable is operable to transmit rotational power to the blade while being flexed along the length of the cable; and a safety release drivingly connected to the distal end of the drive cable, said safety release being drivingly coupled to the motor and operable to transmit rotational power from the motor to the drive cable and thereby the rotary knife, said safety release including input and output members releasably drivingly engaged with one another, with the input member drivingly coupled to and powered by the drive shaft and the output member drivingly connected to the distal end of the drive cable, said safety release operable to drivingly disengage the input and output members when torque applied to the members by the motor exceeds a predetermined amount corresponding with binding of the rotary knife or the drive cable, said input member being directly connected to the motor drive shaft, said safety release being removably attached to the motor and cable, said safety release including a coupling body presenting opposite coupler ends and a chamber extending between the ends, with the input and output members extending through the chamber, said coupler ends each defining a connection axis and presenting a coupler mating surface spaced radially from and extending about the respective connection axis, said motor and said drive cable each including a connector releasably mated with a corresponding one of the coupler ends, with each connector presenting a connector mating surface that is spaced radially from and extending about the respective connection axis, such that each connector and corresponding one of the coupler ends cooperatively presents an associated pair of connector and coupling mating surfaces arranged so that one is slidably received within the other.

4. The powered knife as claimed in claim 3, each pair of mating surfaces cooperating to define a common surface diameter, said input and output members each having a maximum diametrical dimension that is less than the common surface diameter defined by at least one of the pairs, with the members being at least partly positioned within the mating surfaces of the at least one of the pairs.

5. The powered knife as claimed in claim 3, said input and output members each including a plate that presents a corresponding face, with the faces being releasably drivingly engaged with one another, said safety release including a spring operably coupled to the plates to urge the faces into driving engagement, said spring operable to deflect and permit relative rotational movement between the plates when torque applied to the members by the motor exceeds a predetermined amount corresponding with binding of the rotary knife or the drive cable.

6. The powered knife as claimed in claim 5, said input and output members each including a shaft projecting from the respective plate, said shafts being positioned to rotatably support the faces in driving engagement with each other, with the shafts being substantially coaxial to present a shaft axis, said faces being positioned so that the shaft axis is normal to the faces.

7. The powered knife as claimed in claim 3, said rotary knife including a handle connected to the proximal end of drive cable.

8. The powered knife as claimed in claim 7, said spinning blade comprising an endless annular blade, with the blade being rotatably supported adjacent an end of the handle.

9. A rotary knife assembly comprising:

a motor including a rotating drive shaft;

a rotary knife including a spinning blade operable to be powered by the motor;

an elongated flexible drive cable having proximal and distal ends, with the proximal end being drivingly connected to the knife so that the drive cable is operable to transmit rotational power to the blade while being flexed along the length of the cable; and a safety release drivingly connected to the distal end of the drive cable, said safety release being drivingly coupled to the motor and operable to transmit rotational power from the motor to the drive cable and thereby the rotary knife, said safety release including input and output members releasably drivingly engaged with one another, with the input member drivingly coupled to and powered by the drive shaft and the output member drivingly connected to the distal end of the drive cable, said safety release operable to drivingly disengage the input and output members when torque applied to the members by the motor exceeds a predetermined amount corresponding with binding of the rotary knife or the drive cable, said input and output members each including a plate that presents a corresponding face, with the faces being releasably drivingly engaged with one another, said safety release including a spring operably coupled to the plates to urge the faces into driving engagement, said spring operable to deflect and permit relative rotational movement between the plates when torque applied to the members by the motor exceeds a predetermined amount corresponding with binding of the rotary knife or the drive cable, said input and output members each including a shaft projecting from the respective plate, said shafts being positioned to rotatably support the faces in driving engagement with each other, with the shafts being substantially coaxial to present a shaft axis, said faces being positioned so that the shaft axis is normal to the faces, one of said shafts comprising a hollow outer shaft, with the other shaft comprising an inner shaft rotatably received by the outer shaft, said spring being operably coupled between the members, with the spring being received on the inner shaft and positioned within the outer shaft.

10. The powered knife as claimed in claim 9, said spring operable to urge the faces toward each other with a spring force; and an adjustable release element mounted on the inner shaft in engagement with one end of the spring and shiftably positionable along the shaft axis to vary the spring force.

11. The powered knife as claimed in claim 10, said adjustable release element including a threaded fastener, said inner shaft including a threaded section that receives the fastener.

12. The powered knife as claimed in claim 10, said safety release including a bearing element mounted on the inner shaft adjacent an end of the spring opposite the release element and positioned between the spring and plate attached to the outer shaft, with the bearing element permitting relative rotation between the spring and the outer shaft.

13. The powered knife as claimed in claim 9, said safety release including a friction member positioned between and operable to drivingly interconnect the faces of the plates when the plates are spring biased into driving engagement with each other.

14. The powered knife as claimed in claim 9, said input member being directly connected to the motor drive shaft.

15. The powered knife as claimed in claim 14, said safety release being removably attached to the motor and cable.

16. A rotary knife assembly comprising:

a motor including a rotating drive shaft;

a rotary knife including a spinning blade operable to be powered by the motor;

an elongated flexible drive cable having proximal and distal ends, with the proximal end being drivingly connected to the knife so that the drive cable is operable to transmit rotational power to the blade while being flexed along the length of the cable; and a safety release drivingly connected to the distal end of the drive cable, said safety release being drivingly coupled to the motor and operable to transmit rotational power from the motor to the drive cable and thereby the rotary knife, said safety release including input and output members releasably drivingly engaged with one another, with the input member drivingly coupled to and powered by the drive shaft and the output member drivingly connected to the distal end of the drive cable, said safety release operable to drivingly disengage the input and output members when torque applied to the members by the motor exceeds a predetermined amount corresponding with binding of the rotary knife or the drive cable, said safety release including a coupling body presenting opposite coupler ends and a chamber extending between the ends;

said chamber being at least partly defined by a bore that extends from a proximal end of the body toward a distal end of the body along a bore axis, with the bore extending to a distal shoulder of the body, said input and output members including respective input and output shafts rotatably mounted in the body, said shafts being substantially coaxial and extending along the bore axis, with the input and output shafts extending respectively into and out of distal and proximal ends of the body, said input and output members being slidable along the bore axis, with the distal shoulder restricting sliding movement of the members in a distal direction.

17. The powered knife as claimed in claim 16, said safety release including a removable fastener positioned adjacent the proximal end of the body and restricting sliding movement of the input and output members in a proximal direction, with the members being held between the removable fastener and the distal shoulder, said fastener being removable to permit removal of the members from the body.

18. A safety coupling configured to be used with a rotary knife assembly that includes a motor with a motor drive shaft, a rotary knife, and an elongated flexible drive cable, said flexible drive cable configured to transmit rotational power to the rotary knife while being flexed along the length of the cable, said motor and said drive cable each including a connector, with the safety coupling operable to be drivingly connected to the connector of the drive cable and drivingly connected to the connector of the motor, each of said connectors presenting a connector mating surface, said safety coupling configured to transmit rotational power from the motor to the drive cable and thereby to the rotary knife, said safety coupling comprising:

a coupling body presenting opposite coupler ends and a chamber extending between the ends, said coupler ends each defining a connection axis and presenting a coupler mating surface spaced radially from and extending about the respective connection axis, said coupler ends operable to be releasably mated with a corresponding one of the connectors, with the coupler ends configured so that the connector mating surface is spaced radially from and extends about the respective connection axis, said coupler ends configured to cooperate with a corresponding one of the connectors to present an associated pair of connector and coupler mating surfaces arranged so that one is slidably received within the other;

input and output members presenting respective faces releasably drivingly engaged with one another, with the input member operable to be drivingly coupled to and powered by the motor drive shaft and the output member operable to be drivingly connected to the distal end of the drive cable; and a release mechanism that interconnects the members and is operable to drivingly disengage the input and output members when torque applied to the members by the motor exceeds a predetermined amount corresponding with binding of the blade or drive cable, said input and output members and said release mechanism being rotatably supported by the coupling body and positioned within the chamber, said coupler mating surfaces each defining a common surface diameter of the associated pair of connector and coupler mating surfaces, said input and output members each having a maximum diametrical dimension that is less than the common surface diameter, with the members being at least partly positioned within the coupler mating surface of the at least one of the pairs.

19. The safety coupling as claimed in claim 18, said input and output members each including a plate that presents the corresponding face, said release mechanism including a spring mounted in the coupling body and operably coupled to the plates to urge the faces into driving engagement, said spring operable to deflect and permit relative rotational movement between the plates when torque applied to the members by the motor exceeds a predetermined amount corresponding with binding of the blade or drive cable.

20. The safety coupling as claimed in claim 19, said input and output members each including a shaft projecting from the respective plate, said shafts being positioned to rotatably support the faces in driving engagement with each other, with the shafts being substantially coaxial to present a shaft axis, said faces being positioned so that the shaft axis is normal to the faces.

21. The safety coupling as claimed in claim 20, one of said shafts comprising a hollow outer shaft, with the other shaft comprising an inner shaft rotatably received by the outer shaft, said spring being operably coupled between the members, with the spring being received on the inner shaft and positioned within the outer shaft.

22. The safety coupling as claimed in claim 21, said spring operable to urge the faces toward each other with a spring force; and an adjustable release element mounted on the inner shaft in engagement with one end of the spring and shiftably positionable along the shaft axis to vary the spring force.

23. The safety coupling as claimed in claim 22, said adjustable release element including a threaded fastener, said inner shaft including a threaded section that receives the fastener.

24. The safety coupling as claimed in claim 22; and a bearing element mounted on the inner shaft adjacent an end of the spring opposite the release element and positioned between the spring and plate attached to the outer shaft, with the bearing element permitting relative rotation between the spring and the outer shaft.

25. The safety coupling as claimed in claim 19; and
a friction member positioned between and operable to drivingly interconnect the faces of the plates when the plates are spring biased into driving engagement with each other.

26. The safety coupling as claimed in claim 18,
said chamber being at least partly defined by a bore that extends from a proximal end of the body toward a distal end of the body along a bore axis, with the bore extending to a distal shoulder of the body,
said input and output members including respective input and output shafts rotatably mounted in the body,
said shafts being substantially coaxial and extending along the bore axis, with the input and output shafts extending respectively into and out of distal and proximal ends of the body,
said input and output members being slidable along the bore axis, with the distal shoulder restricting sliding movement of the members in a distal direction.

27. The safety coupling as claimed in claim 26; and
a removable fastener positioned adjacent the proximal end of the body and restricting sliding movement of the members in a proximal direction, with the input and output members being held between the removable fastener and the distal shoulder,
said fastener being removable to permit removal of the members from the body.

* * * * *